United States Patent Office 3,489,960
Patented Jan. 13, 1970

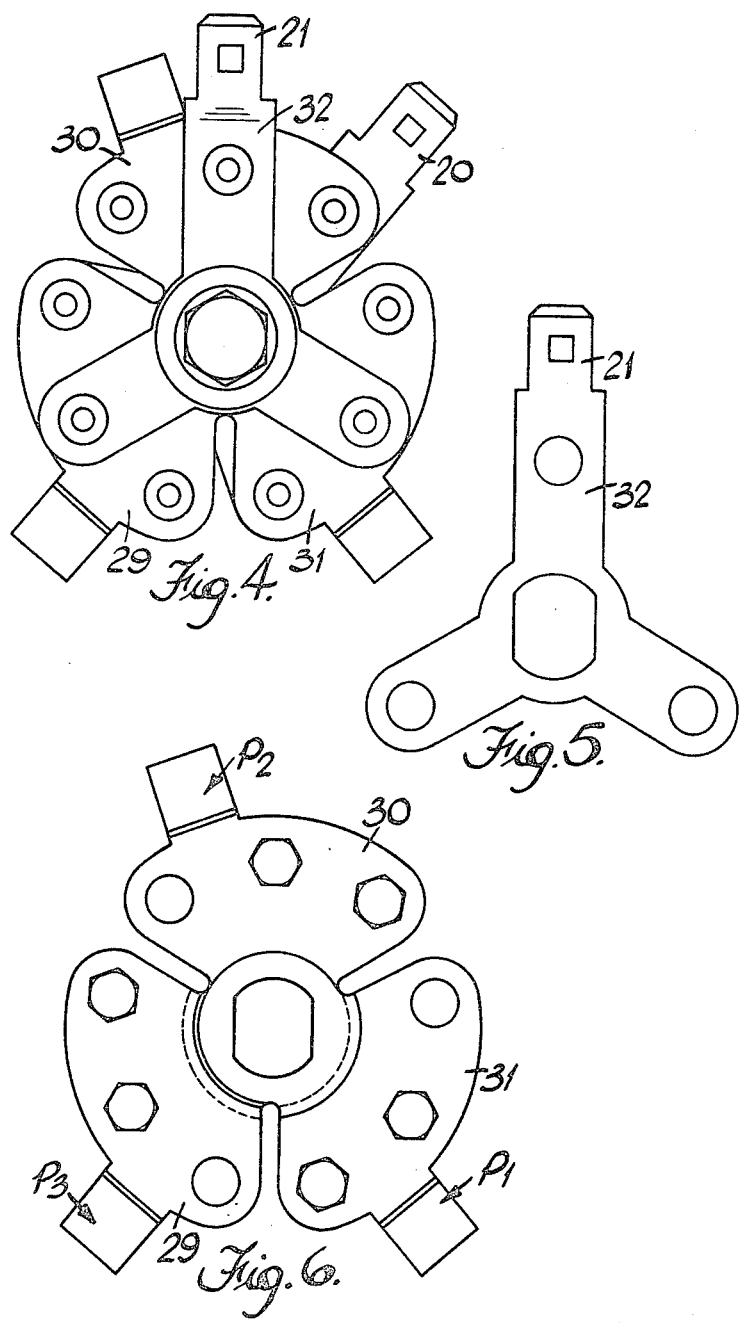

3,489,960
SEMICONDUCTOR RECTIFIERS AND RECTIFIER ASSEMBLIES
Frank Grenville Hudman, Sutton Coldfield, England, assignor to Joseph Lucas (Industries) Limited, Birmingham, England, a British company
Continuation of application Ser. No. 544,732, Apr. 25, 1966. This application Feb. 10, 1969, Ser. No. 800,037
Claims priority, application Great Britain, Apr. 27, 1965, 17,620/65
Int. Cl. H01l 3/00, 5/00, 9/00
U.S. Cl. 317—234                          3 Claims

ABSTRACT OF THE DISCLOSURE

A full wave rectifier assembly having an insulating mounting sleeve and a set of phase plates equal in number to the number of phases of the supply to be rectified, each plate having at least two terminal portions. The set of plates are assembled successively axially, with the terminal portions of each plate angularly spaced from terminal portions of the other plate and the plates being shaped so that all terminal portions lie in the same plane. An additional plate is assembled on each outer side of the assembled set of plates. The outer plates each have terminal portions opposite and axially equidistant from the terminal portions on the set of plates, and insulators insulating all plates from each other. A rectifier connected between the terminal portions on the set of plates and the terminal portions on each outer plate. Connections are made from each plate of the set of plates to a respective phase of the source of supply, and a rectified output appears between the two outer plates.

---

This application is a continuation of application, Ser. No. 544,732, Apr. 25, 1966, now abandoned.

This invention relates to semiconductor rectifiers and rectifier assemblies and has for its object to provide such an assembly in a simple and convenient form.

Figure 1:
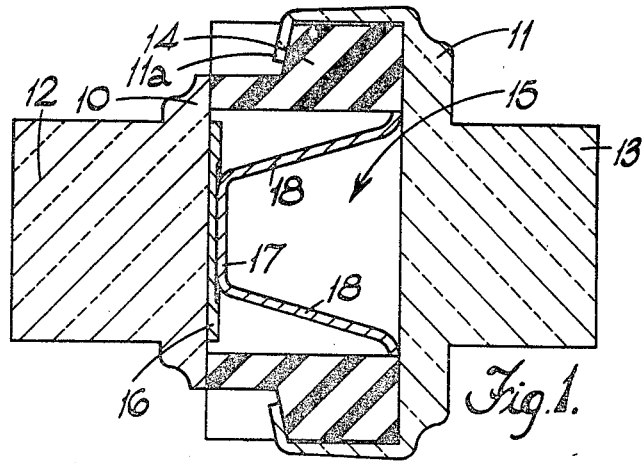
Figure 2:
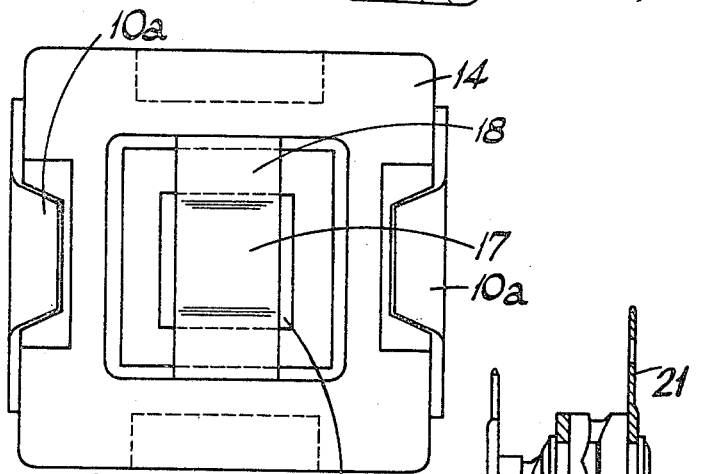
Figure 3:
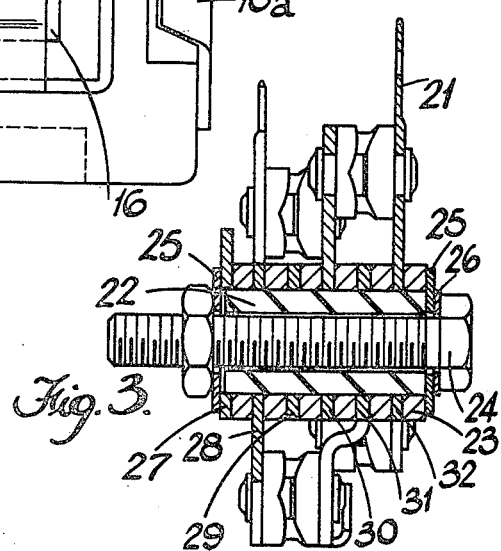
Figure 7:
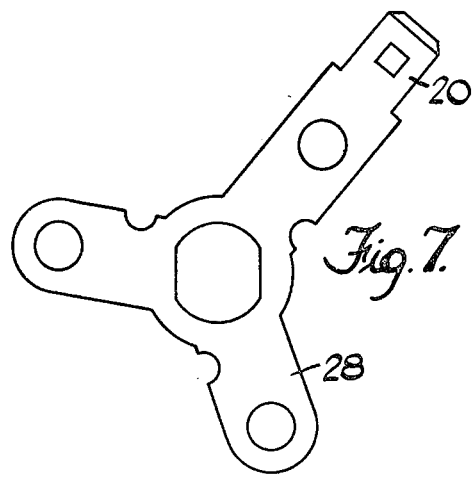
Figure 8:
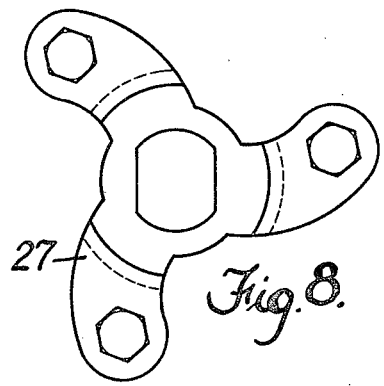
Figure 9:
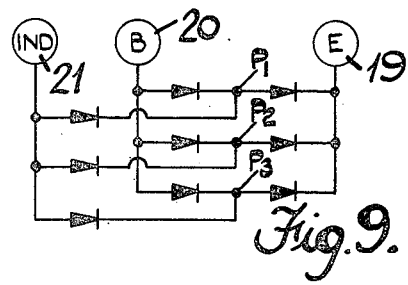

An example of the invention is shown in the accompanying drawings, in which:

FIGURE 1 is a section side view of a rectifier,
FIGURE 2 is a view on the right hand end of FIGURE 1 with the plate 11 removed,
FIGURE 3 is a section view of a rectifier assembly incorporating rectifiers as shown in FIGURES 1 and 2,
FIGURE 4 is an end view of the unit shown in FIGURE 3,
FIGURES 5, 6, 7 and 8 are end views of parts of the unit shown in FIGURE 3, and
FIGURE 9 is a circuit diagram of the unit shown in FIGURE 3.

Referring to FIGURES 1 and 2 of the drawings, there is provided a pair of plates 10, 11 formed from metal and held in spaced relationship to each other by a body 14 formed from electrically insulating material. The plates 10, 11 are provided with integral and outwardly extending projections 12, 13 respectively and the body 14 is hollow. The plates 10, 11 are secured to the body 14 by a pair of diametrically disposed ears 10a, 11a respectively which, during manufacture of the rectifier, are turned over to bear against undercut surfaces formed on the body 14, the pairs of ears being disposed at 90° relative to each other so as to avoid the risk of direct electrical contact between the plates. The body 14 and plates define a sealed enclosure 15.

Within the enclosure 15 is located a semiconductor dice 16 having opposite conductivity regions formed therein. The dice 16 is secured, as by soldering, to a machined face on the plate 10, so that the plate 10 provides an electrical connection to one conductivity region of the dice 16. The other region of the dice is electrically connected to the plate 11 by a metal bridge piece which comprises a base portion 17 from which extend integral and resilient legs 18 the free ends of which bear against the plate 11. In use, besides ensuring a good electrical connection to the plate 11, the legs accommodate expansion which occurs owing to the heating of the dice 16. Conveniently the base portion 17 of the bridge piece is soldered to the dice 16. Moreover, in order to facilitate identification of the polarity of the plates 10, 11 the projections 12, 13 are of different cross-sectional shapes, and in the particular example shown the projection 12 is of hexagonal section whilst the projection 13 is of circular section. Furthermore, the body part is preferably formed from alumina or beryllium oxide.

Where an alternator is provided on a road vehicle for charging a battery, a full wave rectifier is associated with the alternator, and FIGURE 9 illustrates the circuit diagram of such a full wave rectifier. The phase points of a three-phase alternator are connected to the connecting points P1, P2, P3 and a D.C. supply is obtained between positive and negative terminals 19, 20. In addition, it is common to provide three additional diodes and a further negative terminal 21 as shown, the terminal 21 providing an input to a voltage regulator for controlling the alternator output.

FIGURES 3 to 8 illustrate a rectifier assembly constituting the circuit shown in FIGURE 9, the assembly utilising rectifiers of the form shown in FIGURES 1 and 2.

Referring to FIGURES 3 to 8 there is provided a tube 22 of electrically insulating material having a pair of diametrically disposed flats (not shown) formed thereon. Mounted about the tube are a plurality of plates each of which is spaced and insulated from the adjacent plates by spacing washers 23. The plates and washers are held upon the tube 22 by a bolt 24 extending through the tube. Further washers 25 are provided at opposite ends of the bolt, and a spring washer 26 determines the degree of compression applied to the stack of plates and washers.

Starting at the left hand end of the unit, there is provided a plate 27 which is electrically connected to the bolt and which is illustrated in end elevation in FIGURE 8. This plate is provided with three arms defining respectively three terminal portions in which are formed holes of hexagonal shape. Next after a spacing washer is a plate 28 again having three arms defining respectively three terminal portions in which are formed holes of circular section, the plate 28 being shown in end elevation in FIGURE 7. The arms on the plate 27 are cranked to the right as viewed in FIGURE 3 so that the terminal portions of the plate 27 lie in the same plane as the terminal portions of the plate 28. After a further spacing washer is a plate 29 followed by a spacing washer, a plate 30, another spacing washer and a plate 31. The plates 29, 30, 31 are shown together in end elevation in FIGURE 6. Each of the plates 29, 30, 31 has an arcuate terminal portion in which are formed three angularly spaced holes one of which is circular in section and the other two of which are hexagonal in section. Moreover the plates 29, 31 are cranked respectively to the right and to the left as viewed in FIGURE 3 so that the terminal portions of the plates 29, 30, 31 all lie in the plane of the plate 30. Further the plates 29, 30, 31 are provided with tabs P3, P2, P1 respectively whereby the plates can be connected to the phase points respectively of the alternator, the tabs P1, P2, P3 thus corresponding to the points P1, P2, P3 in FIGURE 9. The remaining plate 32 is shown in the elevation in FIGURE 5 and is provided with three arms defining terminal portions in which are formed circular holes respectively. The plates 28 and 32 have connectors formed integrally therewith and these constitute the terminals 20, 21 respectively. The terminal 19 is an earth connection, and so the plate 27, which is earthed through the bolt, requires no connector. The plates are assembled onto the tube in the same angular position in which they are shown so that a hexagonal hole in an arm of one plate is opposite to a circular hole in an arm of another plate. Moreover, during assembly of the plates, rectifiers of the form shown in FIGURES 1 and 2 are located in between the plates by the projections 12, 13 which are accommodated in the appropriate holes. It will be appreciated that this is possible by virtue of the cranking of the plates 27, 29 and 31, which ensures that all the rectifiers lie between the plane of the plate 30 and the plane of one or other of the plates 28, 32, which are equidistant from the plates 30. Finally the projections are headed to secure the rectifiers to the plates. It will be appreciated that the plates 27, 28, 32 serve to interconnect the diodes in the required manner illustrated in FIGURE 9.

The assembly shown in FIGURES 3 to 8 can of course readily be adapted for use where the three additional diodes are not required by omitting the cranked plate 27, earthing the plate 28 and making the appropriate diode connections. Moreover, the assembly can be used with diodes other than the diode shown in FIGURES 1 and 2. In one particular example, each diode is not a preformed unit as shown in FIGURES 1 and 2, but instead has the plate 11 omitted. The assembly is put together in the same way as shown in FIGURES 3 to 8, but one of the plates 27 to 32 constitutes the plate 11 of each of the diodes. In this case the plate acting as the plate 11 will not of course include the projections 13 or the ears 11a, and the body 14 is secured to the plate in some other convenient manner. For example, tongues corresponding to the ears 11a could be cut out of the plates.

I claim:
1. A full wave receifier assembly comprising in combination a set of plates equal in number to the number of phases of the supply to be rectified, mounting means for said assembled plates, each plate having at least two terminal portions and the assembled set of plates being arranged with said terminal portions of each plate angularly spaced from the terminal portions of the other plates and said plates being shaped so that the terminal portions all lie in the same plane, an additional pair of plates on opposite sides of the set of plates respectively and having terminal portions opposite and equidistant from the terminal portions on the set of plates, and rectifiers interconecting the terminal portions on the set of plates and the terminal portions on the pair of plates, the arrangement being such that when the set of plates is connected to the phases of the supply to be rectified, a rectified output appears between the pair of plates.

2. An assembly as claimed in claim 1 in which each plate in the set of plates has three terminal portions and three additional plates are provided instead of said pair of additional plates, one on one side of the set of plates and the other two on the other side of the set of plates, one of said other two plates being cranked so that the terminal portions of said other two plates lie in the same plane.

3. A full wave rectifier assembly comprising in combination a support member, a set of phase plates equal in number to the number of phases in the supply to be rectified, the phase plates being mounted on the support member, insulating means insulating the phase plates from one another, each phase plate having at least two terminal portions and arranged with said terminal portions of each plate angularly spaced from the terminal portions of the other of said plates and said phase plates being shaped so that said terminal portions all lie in the same plane, a pair of terminal plates mounted on said support member, insulating means insulating the terminal plates from one another and from said phase plates, and rectifiers connected between the phase plates and terminal plates, said rectifiers producing a D.C. output between said terminal plates when said phase plates are connected to an alternating supply.

References Cited

UNITED STATES PATENTS

| 2,745,044 | 5/1956 | Lingel | 317—234 |
| 2,806,187 | 9/1957 | Boyer et al. | 317—234 |
| 2,839,710 | 6/1958 | Doucot | 317—234 |
| 2,897,419 | 7/1959 | Howland et al. | 317—234 |
| 3,066,248 | 11/1962 | Miller | 317—234 |
| 3,221,277 | 11/1965 | Hauer | 317—234 X |
| 3,231,795 | 1/1966 | Steinhelder | 317—234 |
| 3,280,389 | 10/1966 | Martin | 317—234 |
| 3,388,739 | 6/1968 | Olson et al. | 317—234 |

FOREIGN PATENTS

| 956,774 | 4/1964 | Great Britain. |
| 662,299 | 4/1963 | Canada. |
| 1,111,461 | 10/1955 | France. |
| 1,127,811 | 10/1956 | France. |
| 1,097,570 | 1/1961 | Germany. |

JOHN W. HUCKERT, Primary Examiner

A. J. JAMES, Assistant Examiner

U.S. Cl. X.R.

317—235